(12) United States Patent
Montanari

(10) Patent No.: US 10,179,494 B2
(45) Date of Patent: Jan. 15, 2019

(54) DEVICE FOR CONNECTING A WHEEL TO A VEHICLE

(71) Applicant: COMCOR ENGINEERING—SRL, Casinalbo (MO) (IT)

(72) Inventor: Giuliano Montanari, Modena (IT)

(73) Assignee: COMCOR ENGINEERING—SRL, Casinalbo (MO) (IT)

( * ) Notice: Subject to any disclaimer, the term of this patent is extended or adjusted under 35 U.S.C. 154(b) by 189 days.

(21) Appl. No.: 15/300,360

(22) PCT Filed: Mar. 31, 2015

(86) PCT No.: PCT/IB2015/000434
§ 371 (c)(1),
(2) Date: Sep. 29, 2016

(87) PCT Pub. No.: WO2015/150904
PCT Pub. Date: Oct. 8, 2015

(65) Prior Publication Data
US 2017/0158017 A1  Jun. 8, 2017

(30) Foreign Application Priority Data

Apr. 2, 2014 (IT) .............................. RE2014A0034
Nov. 27, 2014 (IT) .............................. RE2014A0098

(51) Int. Cl.
*B60G 17/0165* (2006.01)
*B60K 17/04* (2006.01)
*B60B 27/04* (2006.01)

(52) U.S. Cl.
CPC .......... *B60G 17/0165* (2013.01); *B60B 27/04* (2013.01); *B60K 17/043* (2013.01);
(Continued)

(58) Field of Classification Search
CPC .......... B60G 17/0165; B60G 2200/422; B60G 2204/30; B60G 2300/082; B60B 27/04; B60K 17/043
See application file for complete search history.

(56) References Cited

U.S. PATENT DOCUMENTS

| 2,091,509 A | 8/1937 | Kramer |
| 2,208,710 A | 7/1940 | Tjaarda |

(Continued)

FOREIGN PATENT DOCUMENTS

| DE | 102009038424 A1 | 2/2011 |
| EP | 1457378 A2 | 9/2004 |

(Continued)

*Primary Examiner* — Faye M Fleming
(74) *Attorney, Agent, or Firm* — VOlpe and Koenig, P.C.

(57) ABSTRACT

An embodiment of the present invention discloses a device (100) for connecting a wheel to a vehicle (620) comprising: an input shaft (620) able to be kinematically connected to an engine of a vehicle and having a rotation axis (C); an oscillating support (120) able to be hinged to a vehicle frame (T) along a predetermined horizontal hinge axis (B) parallel to and distanced from the rotation axis (C) of the input shaft (620); an auxiliary shaft (125) rotatably associated to the oscillating support (120) according to a rotation axis (A) parallel to and distanced from the hinge axis (B); a wheel-bearing hub (110) rotatably associated to the oscillating support (120) according to a rotation axis (A) parallel to and distanced from the hinge axis (B); first transmission means (625) able to transmit the motion from the input shaft (620) to the auxiliary shaft (125); second transmission means (130) able to transmit the motion of the auxiliary shaft (125) to the wheel-bearing hub (110).

17 Claims, 6 Drawing Sheets

(52) U.S. Cl.
CPC .... *B60G 2200/422* (2013.01); *B60G 2202/40* (2013.01); *B60G 2202/42* (2013.01); *B60G 2204/30* (2013.01); *B60G 2204/4191* (2013.01); *B60G 2204/4193* (2013.01); *B60G 2206/911* (2013.01); *B60G 2300/082* (2013.01); *B60G 2800/0194* (2013.01); *B60G 2800/9124* (2013.01); *B60Y 2200/221* (2013.01)

(56) References Cited

U.S. PATENT DOCUMENTS

| | | | |
|---|---|---|---|
| 3,666,036 A | | 5/1972 | Scerbo |
| 3,806,141 A | | 4/1974 | Janer |
| 4,090,723 A | | 5/1978 | Hart |
| 4,798,260 A | * | 1/1989 | Nakata ................. B60K 17/043 180/253 |
| 6,651,762 B1 | * | 11/2003 | Hokanson ............... B60B 11/00 180/65.1 |
| 6,964,317 B2 | * | 11/2005 | Groves ................. B60G 3/145 180/344 |
| 8,155,834 B2 | * | 4/2012 | Murahashi ............. B60B 11/06 180/339 |
| 9,889,882 B2 | * | 2/2018 | Uranaka ................. B60G 3/20 |
| 2005/0051990 A1 | | 3/2005 | Pond |
| 2006/0283653 A1 | | 12/2006 | Buschena |
| 2013/0228994 A1 | | 9/2013 | Davy et al. |
| 2017/0129331 A1 | * | 5/2017 | Naitou ..................... F16J 15/34 |

FOREIGN PATENT DOCUMENTS

| | | |
|---|---|---|
| FR | 2706369 A1 | 12/1994 |
| WO | 2009156769 A1 | 12/2009 |
| WO | 2012034769 A1 | 3/2012 |

* cited by examiner

DEVICE FOR CONNECTING A WHEEL TO A VEHICLE

TECHNICAL FIELD

The present invention relates to a device for connecting a wheel to a vehicle, such as for example an agricultural tractor or other work vehicle. In particular, the device of the invention is intended for use on small agricultural tractors, for example tractors used for working along rows of trees in fruit orchards, olive groves, or other similar cultivations.

PRIOR ART

As is known, small tractors of the type described schematically comprise a frame or chassis supporting a driving position and an engine, for example an internal combustion engine. Forward and rear wheel axles are associated to the frame and the wheels of the rear axle are connected to the engine such as to provide traction, while the wheels of the forward axle can be turned in order to steer the vehicle.

The drive wheels of the rear axle are normally solidly fixed to the tractor frame. This solution offers the advantage of being extremely simple and sturdy, but suffers from the disadvantage that when the tractor traverses a slope, the drive wheels tend to, remain perpendicular to the terrain, causing the entire tractor frame to incline laterally.

As a consequence, people on board the tractor are obliged to work in an inclined position, which generally renders their work more awkward and complicated as they proceed along a row of a cultivation.

Furthermore, the inclining of the tractor causes the projection of the tractor's centre of gravity to shift towards the downhill wheel, sometimes resulting in instability. If the terrain is very steep, the projection of the centre of gravity can move outside the wheel gauge, this being the space between the wheels, causing the tractor to overturn laterally.

In the light of the preceding observations, there is a strongly felt need in the sector of agricultural tractors for a system of connection of independent drive wheels, such that the drive wheels can be lowered and raised relative to the tractor frame in a controlled way, enabling adjustment of vehicle inclination and levelling of a tractor on sloping terrain.

A response to the described problem has already been implemented on the front axle of some large sized, high cost, four wheel drive tractors. In tractors of this type the suspension of each forward wheel comprises an articulated oscillating arm system based on automobile designs of known type, and comprising connection of a tractor frame to a wheel-bearing hub, providing a degree of vertical excursion, and a hydraulic cylinder able to drive the articulated system. In order to transmit drive to the wheel, the wheel-bearing hub is connected to a differential using a double universal joint.

However, this traditional solution cannot be effectively implemented on the rear wheels of small tractors such as those described hereinabove for at least two reasons.

The first reason is that the distance between the wheels of the rear axle of such tractors (the wheel gauge) is extremely limited, indicatively in a range between 900 mm and 1500 mm. Consequently, in order to permit an adequate vertical excursion of the wheels such as to level the required degrees of inclination, indicatively an excursion of up to 400 mm, the double universal joints used in solutions of known type would be subjected to excessively high angles of inclination for correct operation.

The second reason is that the solution of known type, in addition to moving the wheel vertically, also generates a simultaneous transverse displacement of the wheel as a consequence of the rotation of the oscillating arms of the articulated system. In order to permit the vertical excursions quantified above while limiting transverse displacement to a minimum, the oscillating arms of the articulated system would need to be extremely long, to an extent that is incompatible and irreconcilable with the required wheel gauge dimensions.

In addition to these reasons, it is also obvious that the solution of known type is relatively expensive, as a consequence of the need for both an articulated system and universal joints, such costs generally not being acceptable for small tractors.

An aim of the present invention is to provide a device for connecting a wheel to an agricultural tractor or other vehicle, that permits raising and lowering of drive wheels in an independent and controllable manner, enabling an adjustment of vehicle inclination and a levelling of a tractor on sloping terrains.

A further aim of the present invention is to provide a connecting device that enables relatively large vertical excursion of drive wheels even in the presence of narrow wheel gauges, such as to be suitable for use on small tractors.

A further aim of the invention is to provide a connecting device that enables vertical excursions without compromising the efficiency of drive transmission from the engine to the wheels.

A further aim of the invention is to attain the above-mentioned aims by way of a simple, rational, and relatively economical solution.

These and other aims are attained by the characteristics of the invention as described in the independent claims. The dependent claims delineate preferred and/or particularly advantageous embodiments of the invention.

DISCLOSURE OF THE INVENTION

In particular, an embodiment of the present invention provides a device for connecting a wheel to a vehicle, comprising:
- an input shaft able to be kinematically connected to an engine of the vehicle and having a horizontal rotation axis,
- an oscillating support suitable for being hinged to a frame of a vehicle on a predetermined horizontal hinge axis parallel to and distanced from the rotation axis of the input shaft,
- an auxiliary shaft rotatably associated to the oscillating support and in a position coaxial to the hinge axis,
- a wheel-bearing hub rotatably associated to the oscillating support along a rotation axis parallel to and distanced from the hinge axis,
- first transmission means suitable for transmitting motion from the input shaft to the auxiliary shaft, and
- second transmission means suitable for transmitting motion from the input shaft to the wheel-bearing hub.

As a result of this configuration, the rotation of the oscillating support enables the drive wheels to change position relative to the vehicle frame such as to adapt to a conformation of the terrain, without influencing the efficiency of the transmission means which will connect the input shaft to the wheel-bearing hub.

Since the oscillation of the oscillating support occurs on a vertical plane perpendicular to the rotation axis of the wheel-bearing hub, the wheel associated to the oscillating support also always remains vertical. In this way the displacement of the wheels does not influence the width of the wheel gauge in any way, so that the wheel gauge can be maintained relatively narrow. The connecting device of the present invention is relatively simple, compact, and economical from a constructional perspective.

Further, owing to the presence of the auxiliary shaft and the two drive transmission means, it is advantageously possible to maintain the original wheel gauge of the tractor, as the axis of the wheel-bearing hub can be borne in proximity of the axis of the input shaft, which in turn can possibly coincide with the axis of the half-shafts of the differential.

In particular, the distance between the rotation axis of the input shaft and the hinge axis of the oscillating supported can be substantially equal to the distance between the hinge axis and the rotation axis of the wheel-bearing hub.

In this way, for a predetermined angular position of the oscillating support, the axis of the wheel-bearing hub can coincide with the axis of the auxiliary axis, so that the use of the device of the invention does not implicate any change to the original wheelbase of the tractor.

In an aspect of the invention, the connecting device can further comprise an actuator element able to rotate the support element about a hinge axis thereof.

With this solution, by commanding the oscillation of the oscillating support around a hinge axis thereof, the actuator elements of the connecting device enable raising and lowering the wheel-bearing hub in a controlled manner relative to the vehicle frame, and therefore the distance of the vehicle frame from the terrain is locally varied, enabling adjustment of vehicle inclination and levelling of the tractor on sloping terrain.

Since the displacement of the oscillating support and the wheel occur on a vertical plane, the centre of gravity of the tractor can always be maintained in the centre of the support base, even when the tractor is on sloping terrain, improving the stability and safety of the tractor.

In an aspect of the invention, the actuator element of the oscillating support can comprise a double-acting hydraulic cylinder.

This solution has the advantage of being easily implemented and requiring low maintenance.

In an alternative aspect of the invention, the actuator element can comprise a cogged crown/endless screw group.

This solution provides the advantage of ensuring high precision and stability for the positioning of the oscillating support.

In a further alternative aspect of the invention, the actuator element can comprise a nut/nut screw group.

This solution substantially provides the same advantages as the preceding embodiment at potentially lower cost.

In other embodiments, the connecting device might be devoid of an actuator element and be additionally connected to the vehicle frame using a spring and/or a shock absorber.

In this way, the connecting device described above would operate substantially as a form of suspension, and provide the advantage of being capable of absorbing incidental loads transmitted to the vehicle due to an uneven conformation of terrain.

In a further aspect of the invention the transmission means between the input shaft and the wheel-bearing hub can comprise at least a gearing, typically a reduction gearing.

The advantage of this aspect is that gearing is a reliable system for transmitting to a wheel the high drive torque required to drive the vehicle.

In a further aspect of the invention, the oscillating support can comprise a guard cover suitable for containing the transmission means.

With this solution, the guard cover provides the advantage of ensuring the safety of operators and protecting the transmission means from foreign agents that could damage or compromise the operation of the transmission means. The guard cover also encloses the transmission means inside a limited space in which the transmission means can be easily lubricated.

In a further aspect of the invention the input shaft can be coaxially housed in a tubular sleeve fixed to the oscillating support, the tubular sleeve being cylindrical or exhibiting a cross-section of any shape.

The tubular sleeve provides the dual advantage of protecting the input shaft from the external environment and permitting a simple articulation of the oscillating support on the vehicle frame.

In this regard a related further aspect of the invention is that the tubular sleeve is rotatably inserted into a tubular element fixed to the vehicle frame. With this solution, the mutual insertion of the tubular sleeve inside the tubular element, centrally exhibiting the auxiliary shaft, forms a sufficiently rigid and sturdy joint so as to effectively withstand stresses deriving from a weight of the vehicle on a wheel.

In an aspect of the invention, the input shaft can be coaxially connected to the half-shaft of the differential. For example, it might itself actually be the half-shaft of the differential.

In this way, the assembly is much more compact, enabling realising a tractor with a very small wheelspan.

In a further aspect of the invention, the first transmission means (between the auxiliary shaft and the input shaft) can also comprise a gearing.

The advantage of this solution is that the gearing is a reliable system for transmitting to a wheel the high drive torque required to drive the vehicle.

In an aspect of the invention, the input shaft can be rotatably coupled and supported by a further support element, which can be fixed to the frame of the vehicle and to which the oscillating frame is also directly hinged.

In this way, the above-described device in effect becomes an autonomous component which can be constructed and assembled separately with respect to the tractor and thus mounted on the frame thereof at a later time. With this characteristic the device can also be used as a modifying kit for already-existing tractors, enabling them to acquire the capacity to vary the height of the wheels.

The present invention further provides an axle group, which comprises two connecting devices of the type described herein above, independent from one another and having respective input shafts aligned along a same axis, and a vehicle comprising the axle group.

These further embodiments of the invention implement the advantages of the invention as described herein above, in particular the advantage of enabling an adjustment of vehicle inclination and levelling of the vehicle by way of a compact, efficient, and relatively simple solution.

BRIEF DESCRIPTION OF THE DRAWINGS

Further characteristics and advantages of the invention will better emerge from the detailed description made herein, provided by way of non-limiting example in the accompanying figures of the drawings.

PREFERRED EMBODIMENT OF THE INVENTION

Figure 1:
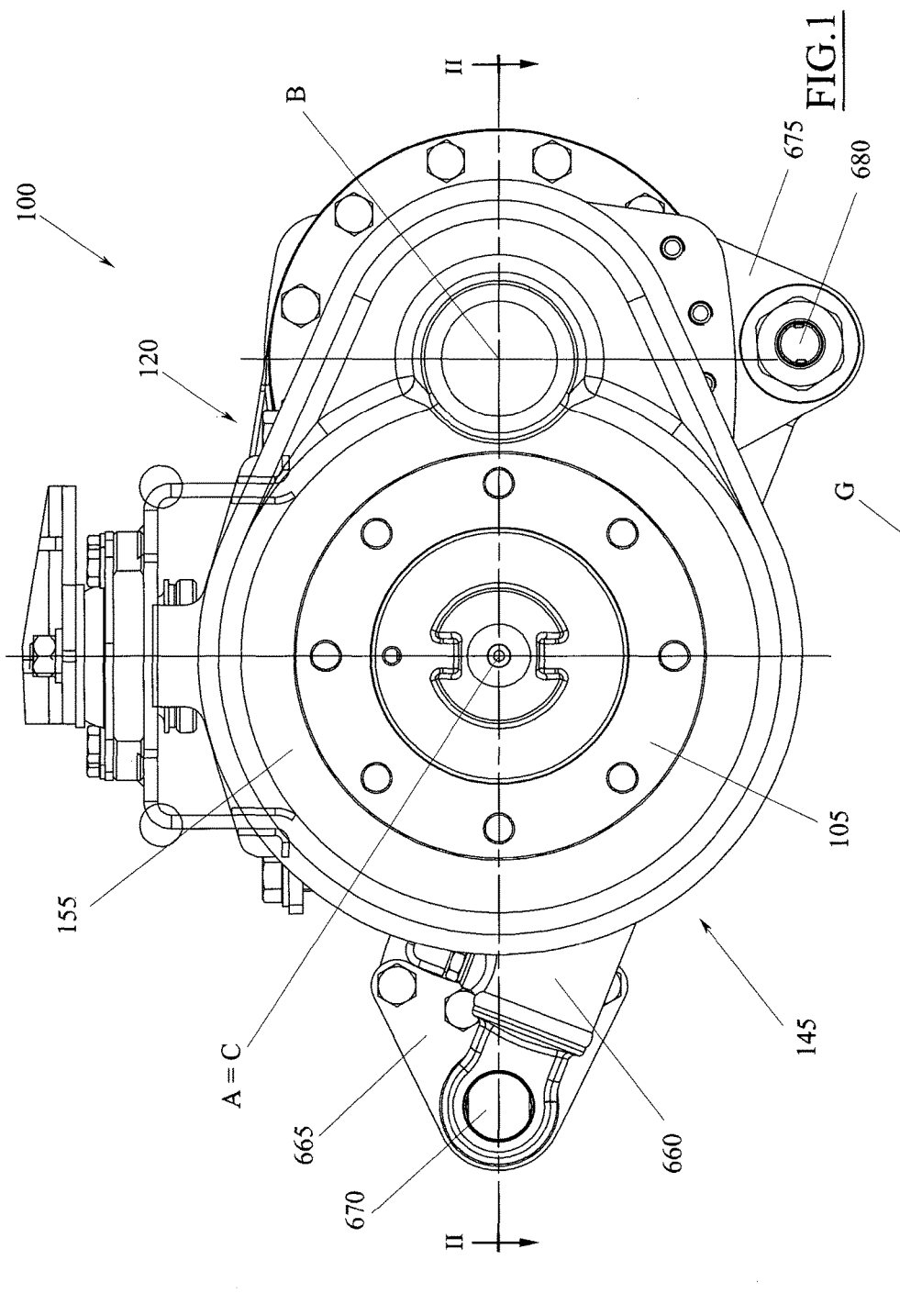
FIG. 1 is a side view of a connecting device in an embodiment of the present invention, in which the device is shown without a wheel.

An embodiment of the present invention regards an agricultural work vehicle (not fully depicted), for example a small tractor designed for working along rows of trees in fruit orchards, olive groves, or other cultivations of similar type.

In more schematic terms the tractor comprises a frame supporting a driving position, an engine, a forward axle group, and a rear axle group.

Each axle group comprises a pair of wheels, in which the wheels of the rear axle group are connected to the engine such as to provide traction to the tractor, while the wheels of the forward axle group are steerable such as to determine a direction of travel of the tractor.

In some embodiments of the invention, the tractor might be of a four wheel drive type, in which case the wheels of the forward axle group are also connected to the engine.

The wheels of the forward axle group can be connected to the tractor frame using a beam axle suspension of known type.

The wheels of the rear axle group are instead connected to the tractor frame using two independent connecting devices, each of which can be of the type depicted and labelled with reference number 100 in the figures.

The connecting device 100 comprises a bracket 105 able to be coaxially bolted to a rim of a wheel, which bracket 105 is fixed on an end of a central and coaxial hub 110.

The central hub 110 is rotatably associated and axially constrained to an oscillating support 120, relative to which the hub 110 can rotate around a central axis A thereof.

An auxiliary shaft 125 is also rotatably associated and axially constrained to the oscillating support 120, the auxiliary shaft 125 being rotatable around a central axis B thereof, which is parallel to but distanced from the axis A of the central hub 110.

The auxiliary shaft 125 is kinematically connected to the central hub 110 by means of a gearing 130.

The gearing 130 can comprise a cogged wheel 135 coaxial and solid in rotation with the central hub 110, which is positioned in engagement with a cogged pinion 140 coaxial and fixed to the auxiliary shaft 125.

The primitive diameter of the cogged wheel 135 can be greater than the primitive diameter of the cogged pinion 140, such as to reduce the speed between the auxiliary shaft 125 and the central hub 110.

In more detail, the oscillating support 120 comprises a guard cover 145 enclosing the gearing 130 and exhibiting in projection on one side an extremity of the central hub 110, which supports the bracket 105, and exhibiting on an opposite side the auxiliary shaft 125.

In particular, the guard cover 145 comprises a frontal concave casing 155 and a rear cover 160 that closes the frontal casing 155, delimiting an internal chamber 165 in which the gearing 130 is enclosed. The projecting portion of the auxiliary shaft 125 is coaxially inserted into an external cylindrical sleeve 150, which projects from and is solidly fixed to the guard cover 145.

In the illustrated example, the external cylindrical sleeve 150 is made in a single body with the rear cover 160. In other embodiments, the external cylindrical sleeve 150 might be however realised as a separate component which is fixed to the rear cover 160. The external cylindrical sleeve 150 can be a tubular element of any transversal section shape.

The external tubular sleeve 150 is coaxially inserted on an internal cylindrical sleeve 600, with respect to which it can rotate about the central axis B of the auxiliary shaft 125.

In particular, the external cylindrical sleeve 150 is rotatably associated to the internal cylindrical sleeve 600 by means of an interposing of a pair of bushes 605, and is axially constrained between a first flange 610 and a second flange 615, which is fixed (in the example screwed) to the opposite end of the internal cylindrical sleeve 600, internally of the guard cover 145.

The central hub 110 is rotatably supported inside the guard cover 145 by a pair of bearings 170, of which a first bearing being fixed to the frontal casing 155 and a second bearing fixed instead to the rear cover 160, the cogged wheel 135 being positioned between the bearings. The central hub 110 projects through an aperture in the bottom of the frontal casing 155, projecting the bracket 105 externally.

Appropriate seal gaskets can be predisposed at the apertures through which the central hub 110 projects, so as to ensure the sealing of the internal chamber 165 of the guard cover 145, which can thus be filled with grease or another suitable lubricant for the gearing 130.

The auxiliary shaft 125 is rotatably supported inside the guard cover 145 by a pair of bearings 175, of which a first bearing being constrained to the frontal casing 155 and a second bearing fixed instead to the internal cylindrical sleeve 600, the cogged pinion 140 being positioned between the bearings.

As the explanation makes clear, the auxiliary shaft 125, the gearing 130, the central hub 110, and the guard cover 145, globally define a reduction gear that transmits a rotary motion from the auxiliary shaft 125 to the central hub 110 at a suitable speed ratio established by the gearing 130.

The device 100 further comprises an input shaft 620, which has a rotation axis C parallel to and distanced from the central axis B of the auxiliary shaft 125.

The input shaft 620 can be rotatably coupled to and supported by a further support element 641, to which the flange 610 of the internal cylindrical sleeve 600 is also fixed, which realises the hinge to the oscillating frame 120.

The distance between the axis C of the input shaft 620 and the axis B of the auxiliary shaft 125 is preferably (though not necessarily) equal to the distance between the axis B of the auxiliary shaft 125 and the axis A of the central hub 110; so that the axes A and C can also be substantially coinciding for a predetermined angular position of the oscillating support 120 with respect to the internal cylindrical sleeve 600 i.e. to the rotation axis B.

In order to obtain this effect or in any case to return the central hub 110 in proximity of the input shaft 620, the support frame 120 is generally orientated so as to superpose on the support element 641, so that the rotation axes A and C are both positioned on the same side with respect to the oscillation axis B.

The input shaft 620 is kinematically connected to the auxiliary shaft 125 using a second gearing 625.

The second gearing 625 can comprise a cogged wheel 630 coaxial to and fixed in rotation to the central hub 620, which is positioned in engagement with a cogged wheel 635 coaxial to and solid in rotation to the auxiliary shaft 125, in the example located at an end of the auxiliary shaft 125 which exits axially from the internal cylindrical sleeve 600, projecting out of the first shaft 610.

The primitive diameter of the cogged wheel 630 can be substantially equal to the primitive diameter of the cog wheel 635, so that the gearing 625 defines an almost-unitary transmission ratio between the input shaft 620 and the auxiliary shaft 125.

In the specific example illustrated herein, the cogged wheel 630 is made in a single body with the input shaft 620 and the cogged wheel 635 is made in a single body with the auxiliary shaft 125. It is however possible that in other embodiments the cogged wheel 630 and/or the cogged wheel 635 can be made as separate bodies which are constrained in rotation to the input shaft 620 and respectively to the auxiliary shaft 125 with any known system, for example by splining.

The cogged wheels 630 and 635 of the gearing 625 are contained internally of a narrow chamber 640, which is defined internally of a second guard cover 642 which belongs to the support element 641.

In the illustrated example, this second guard cover 642 comprises two substantially flat covers, of which a front cover 645 which is fixed (for example bolted) to the first flange 610 of the internal cylindrical sleeve 600 (on the opposite side with respect to the oscillating support 120) and a rear cover 650 which is directly fixed (for example bolted) to the front guard cover 645.

The input shaft 620 can be rotatably coupled, by interposing a bearing 655, on the front cover 645 and can further project externally of the rear cover 650 through a corresponding aperture.

Figure 3:
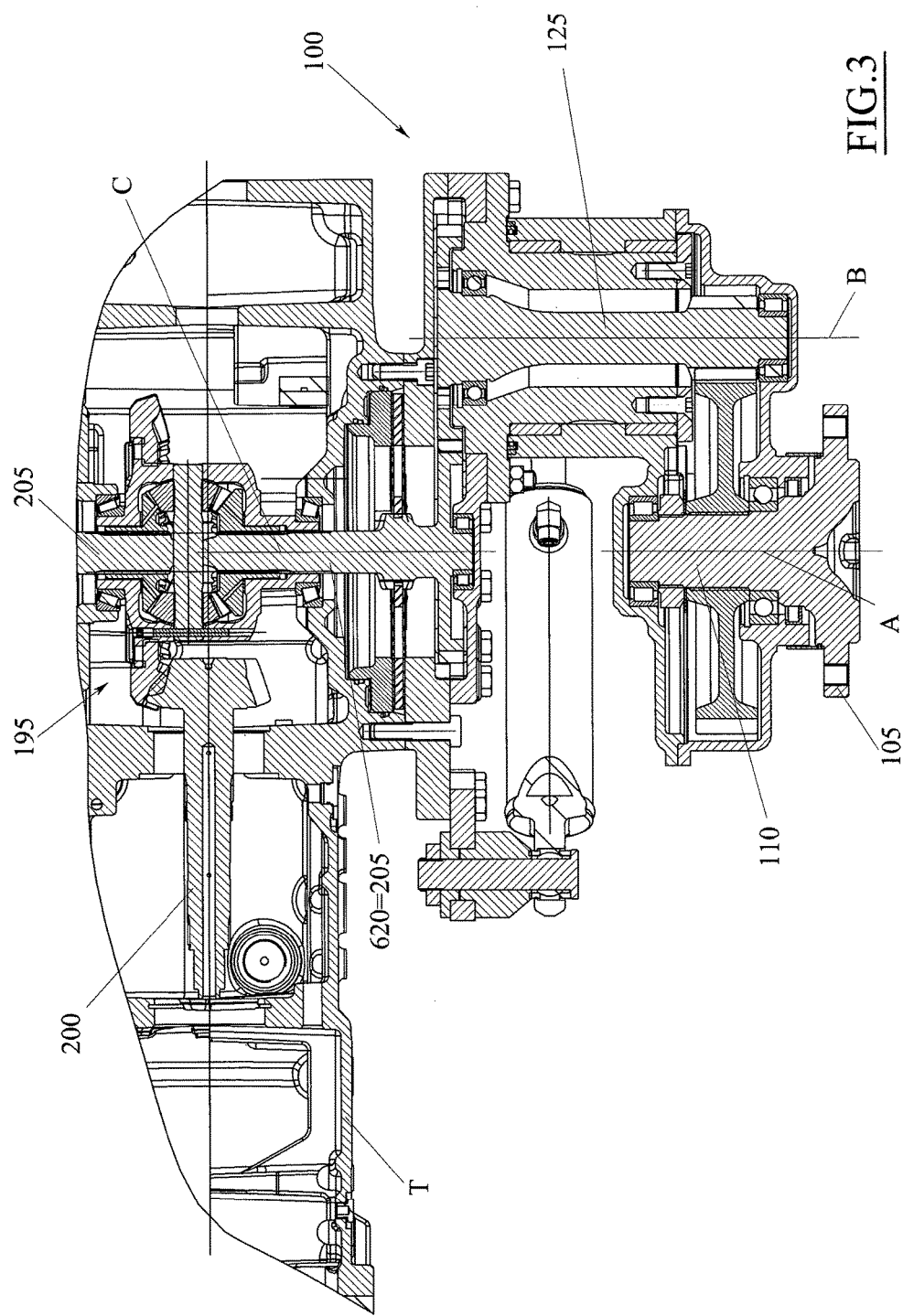
FIG. 3 is transversal section II-II of FIG. 2 showing the wheel.

By means of the rear cover 650 of the guard cover 642, the support element 641 and therefore the whole device 100 can be fixed (for example bolted) to the frame T of the tractor, so that the oscillating support 120 can oscillate with respect to the second guard cover 642 and therefor with respect to the frame T by rotating about an axis coinciding with the central axis B of the auxiliary shaft 125 (see FIG. 3).

In particular, the device 100 can be fixed to the frame T in such a way that the axis C of the input shaft 620 and the axis B of the auxiliary shaft 125 lie in a plane destined to remain parallel to the terrain G on which the wheel is resting.

It is however possible, in other embodiments, for the plane on which the axes C and B lie can be inclined with respect to the terrain G. For example, the plane on which the axes C and B lie might be inclined uphill or downhill by an angle comprised between 0° and 60°, preferably comprised between 10° and 30°. It is however possible for the position of the axes C and B to be inverted with respect to what is shown in FIG. 1.

In this configuration, the input shaft 620 can be kinematically connected to the tractor engine, such that the tractor engine can drive the wheel in rotation.

This configuration can be obtained using a known transmission system exhibiting a differential 195, which comprises a shaft 200 suitable for connecting to the engine, and two half-shafts 205, coaxial and opposite, that can be individually connected to a wheel of the rear axle group.

In the illustrated embodiment, the auxiliary shaft 620 of the device 100 coincides with (i.e. is constituted by) one of the two half-shafts 205 of the differential 195.

In other embodiments, the input shaft 620 might however be an intermediate shaft which is coaxially joined to the half-shaft 205 of the differential 195.

In any case, the input shaft 620 is always kinematically connected to the tractor engine, such that the tractor engine can drive the wheel in rotation via the first and second gearing.

Naturally the same considerations are also valid, in an entirely like manner, for the device 100 which bears the second wheel (not illustrated) of the rear axle group, which will comprise or will be connected to the other half-shaft 205 of the differential.

Normally, the oscillating support 120 of each device 100 is able to remain in the position depicted in FIG. 1, in which the axis A of the central hub 110 substantially coincides with the axis C of the input shaft 620, i.e. with the axis of the half-shaft 205 of the differential 195.

In this way, the presence of the oscillating support 120 does not substantially modify the wheelbase of the tractor to which the device 100 is applied.

Starting from this position of normal use, the oscillating support 120 can be rotated relative to the tractor frame T around the axis B, such as to lower or raise the central hub 110 and the wheel R, and locally vary the distance of the frame T from the terrain G.

This oscillation is actuated by suitable actuator means 210, which are also capable of maintaining the oscillating support 120 solidly constrained in all of the achievable angular positions.

Figure 2:
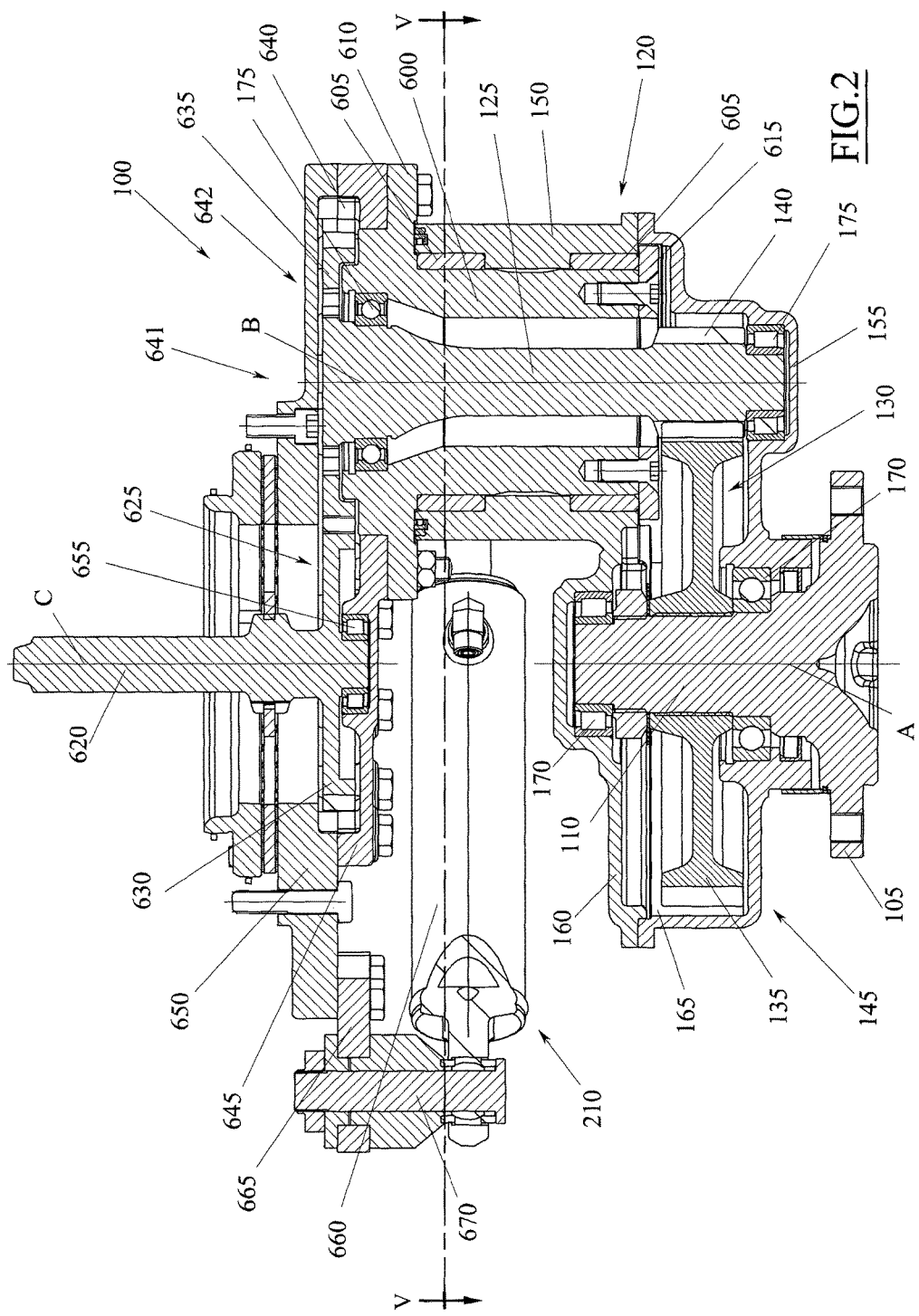
FIG. 2 is transversal section II-II of FIG. 1 showing the wheel.

In the embodiment of the invention shown in FIGS. 1 and 2, the actuator means 210 of each connecting device 100 comprise a double-acting hydraulic cylinder 660. An end of the hydraulic cylinder 660 is hinged to a support element 665, which is solidly fixed to the rear cover 650. The axis of the hinge pin 670 between the hydraulic cylinder 660 and the support element 665 is parallel to and distanced from the axis B of oscillation of the oscillating support 120, relative to which it is positioned at the same height above the terrain G.

The opposite end of the hydraulic cylinder 660, in the example the end of the rod, is hinged to a projecting flange element 675 solidly fixed to the oscillating support 120. The axis of the hinge pin 680 between the hydraulic cylinder 660 and the projecting lever 675 is parallel to and distanced from the axis B of oscillation of the gear reducer, relative to which it is positioned at a lower distance from the terrain G.

Figure 4:
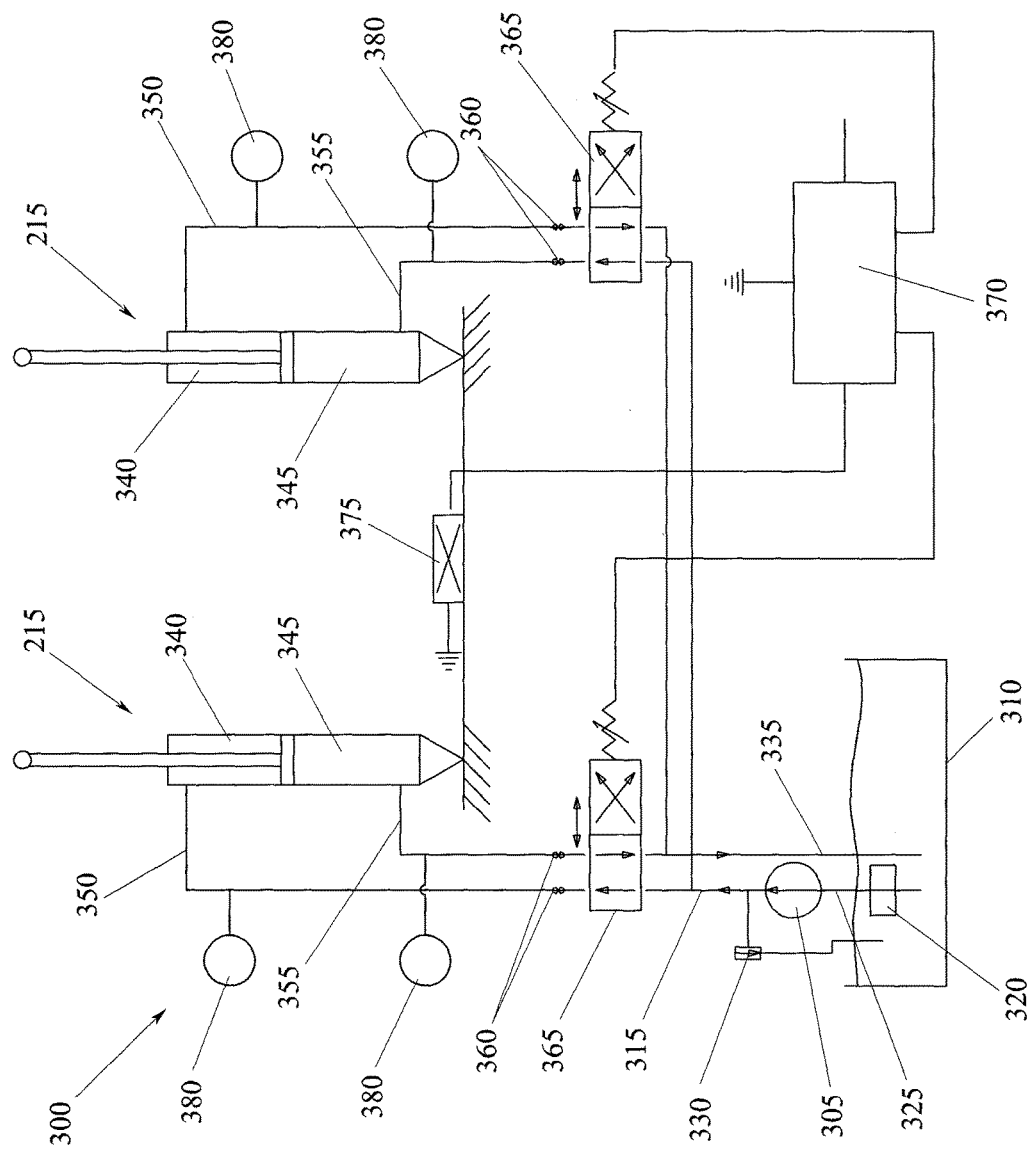
FIG. 4 is a hydraulic drive circuit diagram of the connecting device of FIG. 1.

Since the hinge pins 670 and 680 can be slightly axially out of phase, a ball joint can be interposed between each hinge pin and the respective end of the hydraulic cylinder 660 such as to permit small transversal displacements. The two hydraulic cylinders 660 that actuate the connecting devices 100 of the rear axle group can be connected to a hydraulic circuit 300 like the one depicted in FIG. 4.

The hydraulic circuit 300 comprises a pump 305 that draws hydraulic fluid from a reservoir 310 and drives the fluid under pressure along a supply conduit 315. A filter 320 can be fitted on the intake conduit 325 of the pump 305, such as to trap any impurities contained in the oil. A maximum pressure valve 330 can be fitted on the supply conduit 315, for discharging the hydraulic fluid directly into the reservoir 310 when the pressure exceeds a threshold value. A return conduit 335 also enters the reservoir 310 for the return of the fluid that circulates in the hydraulic circuit 300.

The two pressure chambers 340 and 345 of each hydraulic cylinder 660 are connected respectively to a first conduit 350 and a second conduit 355, each of which is equipped with a respective double-acting check valve 360. The first and the second conduits 350 and 355 are connected to a hydraulic distributor with an electronic control system 365, which can be selectively activated by a direct configuration or an inverted configuration. In the direct configuration (illustrated in the figures), the hydraulic distributor 365 establishes communication between the first conduit 350 and the supply conduit 315, and between the second conduit 355 and the return conduit 335, such that the hydraulic fluid enters the first chamber 340 inducing a shortening of the hydraulic cylinder 660. In the inverted configuration the hydraulic distributor 365 establishes communication between the first conduit 350 and the return conduit 335, and between the second conduit 355 and the supply conduit 315, such that the hydraulic fluid enters the second chamber 345 inducing an elongation of the hydraulic cylinder 660.

The hydraulic distributors 365 are controlled by an electronic control unit 370 in response to a control signal arriving from an inclinometer sensor 375, for example a double slide electronic inclinometer sensor, installed on the tractor frame T. In this way the electronic control unit 370 can automatically control the hydraulic distributors 365, and so the position of the wheel R of the rear axle group (i.e. the axis A of the hub 110), such that the tractor frame T remains substantially horizontal.

For example, when the sensor 375 detects that the tractor is inclining laterally, for example because the tractor is traversing a slope, the electronic control unit 370 can automatically control the hydraulic distributors 365, such as to elongate the hydraulic cylinder 660 of the wheel R which is downhill, and possibly shorten the hydraulic cylinder of the wheel R which is uphill. In this way the wheels move vertically relative to the tractor frame T, which can be maintained in a configuration of virtually zero lateral inclination.

When the desired position of wheel R has been reached, the electronic control unit 370 can activate the check valves 360 such as to prevent any further flow of hydraulic fluid to or from the pressure chambers 340 and 345, stably locking the hydraulic cylinder 660 in the position attained.

In some embodiments of the invention, hydraulic accumulators 380 can be fitted, respectively, on the first conduit 350 and on the second conduit 355 such as to absorb impacts on the wheels while the tractor is moving, for example as a consequence of the roughness of the terrain.

Figure 5A:
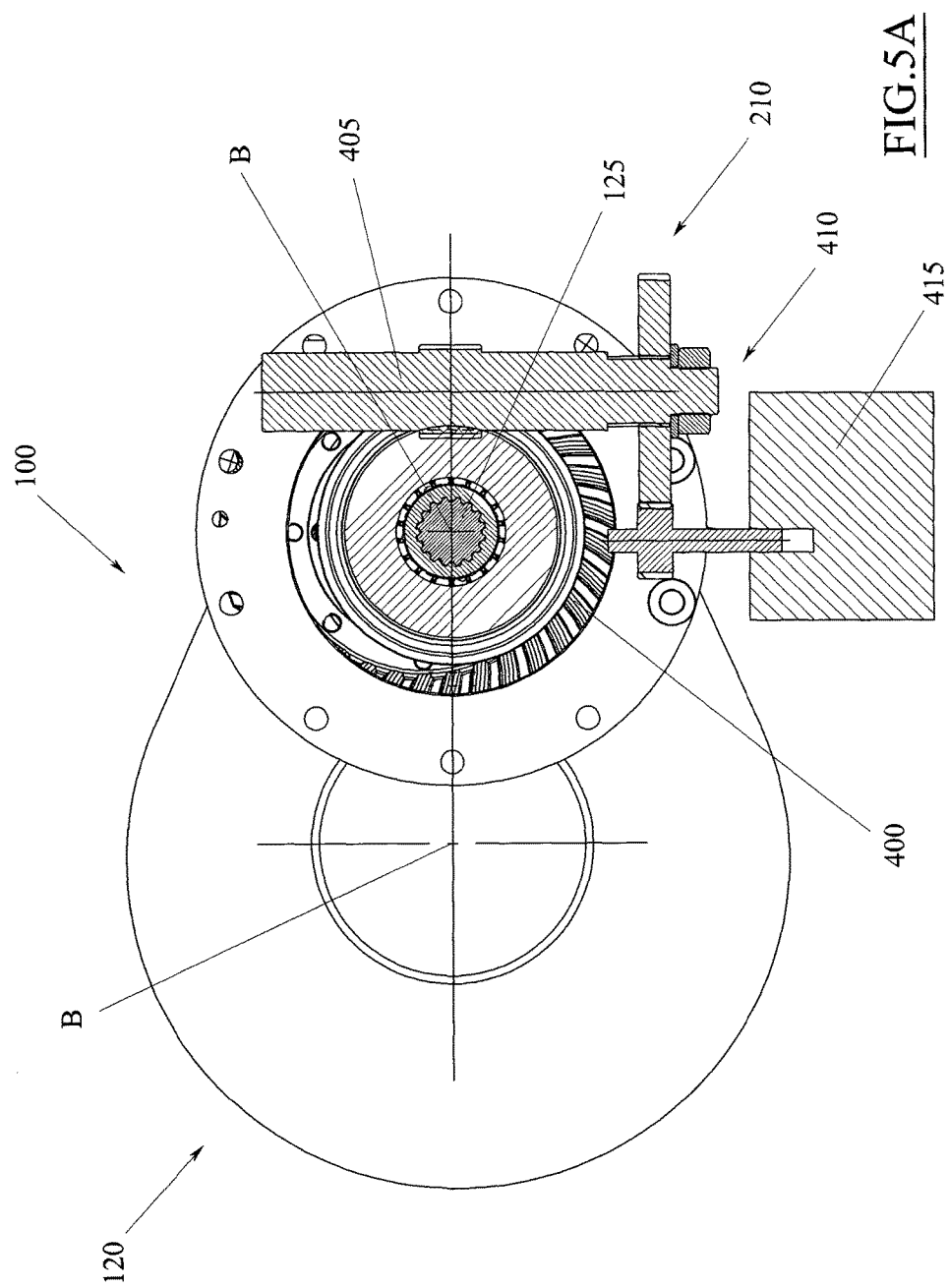
FIG. 5A is transversal section V-V of FIG. 2 of a connecting device in an alternative embodiment of the invention.

FIG. 5A depicts a connecting device 100 in an alternative embodiment of the invention, which differs from the embodiment described herein above only as regards the actuator means 210. In this case, the actuator means 210 comprise a cogged crown wheel 400, which is solidly fixed to the oscillating support 120, in a position coaxial to the intermediate shaft 125. The actuator means 210 further comprise a worm screw 405, which is constrained to rotate about itself in a fixed position with respect to the vehicle frame T, enmeshing with the cogged crown wheel 400. A reduction gearing 410 can be used to connect the worm screw 405 to an actuating motor 415, for example a hydraulic engine. In this way, the actuating motor 415 can rotate the worm screw 405 selectively in a direction or in an opposite direction, causing the rotation of the cogged crown wheel 400 and consequently the oscillation of the oscillating support 120. In some embodiments of the invention, the actuating motor 415 could be substituted by a manually activated device, for example by a crank.

Figure 5B:
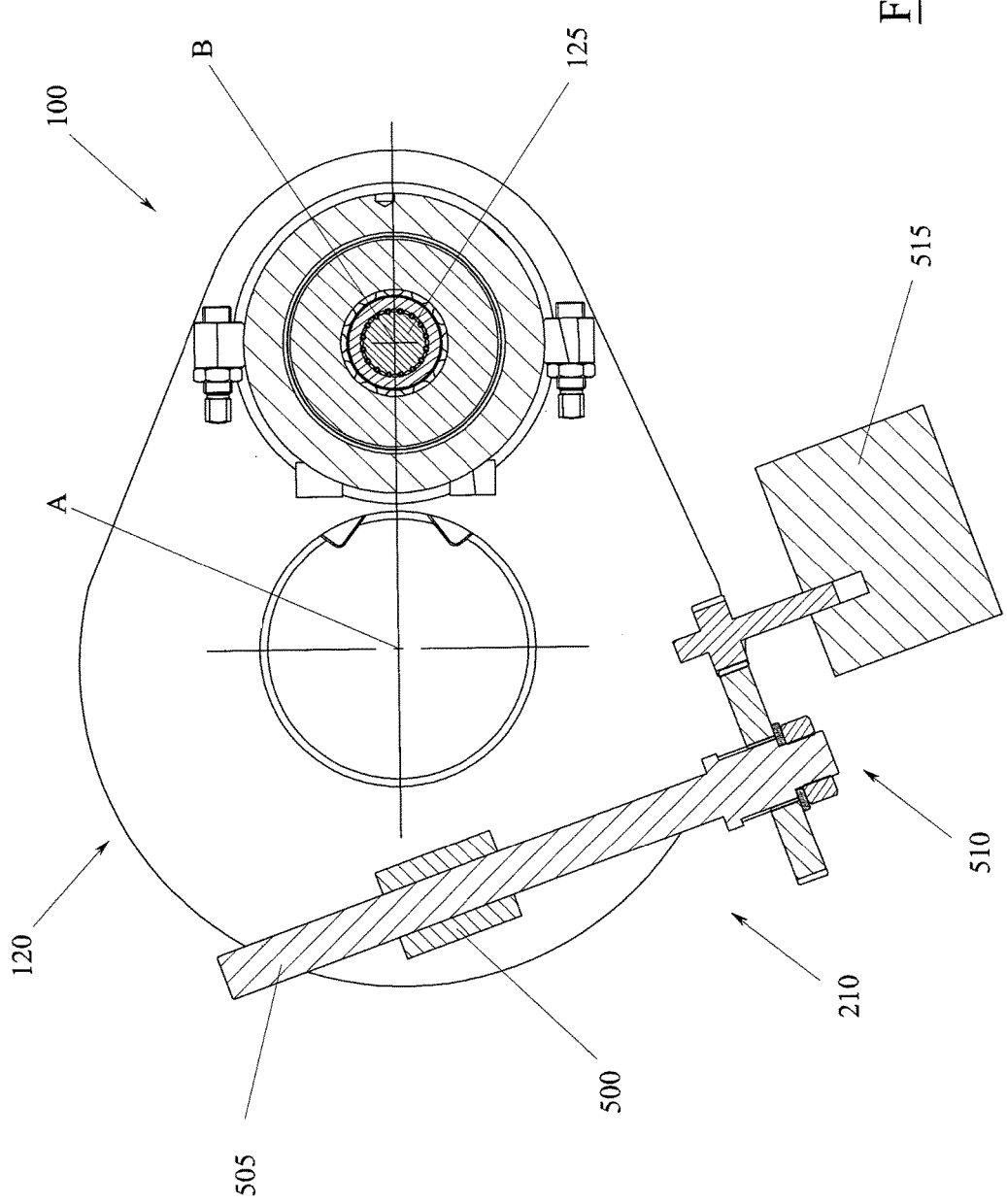
FIG. 5B is transversal section V-V of FIG. 2 of a connecting device in a further alternative embodiment of the invention.

FIG. 5B depicts a connecting device 100 in a third embodiment of the invention, which differs from the embodiments described herein above only as regards the actuator means 210. In this case, the actuator means 210 comprise an internally threaded block such as to form a nut screw 500. The nut screw 500 is solidly fixed to the oscillating support 120 in an offset position relative to the axis B of the auxiliary shaft 125. In particular, the nut screw 500 can be fixed to the oscillating support 120 using a joint (not shown in the figures) which enables the nut screw 500 to oscillate around a rotation axis parallel to the axis B. The actuator means 210 further comprise a screw 505, which is constrained to rotate in a fixed position relative to the vehicle frame T and is coaxially screwed into the nut screw 500. A reduction gearing 510 can be used to connect the screw 505 to a actuating motor 515, for example a hydraulic engine. In this way the actuating motor 515 can rotate the screw selectively in a direction or in an opposite direction, causing the rotation of the nut screw 500 and consequently the oscillation of the oscillating support 120. In some embodiments of the invention, the actuating motor 515 could be substituted by a manually activated device, for example by a crank.

In a further embodiment of the invention the connecting device 100 described herein above could be devoid of any actuator element 210, and the oscillating support 120 could be additionally connected to the vehicle frame (T) using a spring and/or a shock absorber. For example, the spring and/or shock absorber group could, for example, substitute the hydraulic cylinder 660. In this way, the connecting device 100 would function as a suspension capable of absorbing loads transmitted from the terrain to the vehicle through the wheels.

Obviously a technical expert in the sector could introduce numerous modifications of a practical-technical nature, without forsaking the scope of the invention as claimed below.

The invention claimed is:

1. A device (100) for connecting a wheel (R) to a vehicle, the device (100) comprising:
    an input shaft (620) able to be kinematically connected to an engine of the vehicle and having a rotation axis (C),
    an oscillating support (120) suitable for being hinged to a frame (T) of the vehicle on a predetermined hinge axis (B) parallel to and distanced from the rotation axis (C) of the input shaft (620),
    an auxiliary shaft (125) rotatably associated to the oscillating support (120) in a position coaxial to the hinge axis (B),
    a wheel-bearing hub (110) rotatably associated to the oscillating support (120) along a rotation axis (A) parallel to and distanced from the hinge axis (B),
    a first transmission device (625) configured to transmit motion from the input shaft (620) to the auxiliary shaft (125), and
    a second transmission device (130) configured to transmit motion from the auxiliary shaft (125) to the wheel-bearing hub (110),
wherein a distance between the rotation axis (C) of the input shaft (620) and the hinge axis (B) is substantially equal to a distance between the hinge axis (B) and the rotation axis (A) of the wheel-bearing hub (110), and
wherein the oscillating support (120) is orientated in such a way that the rotation axis (A) of the wheel-bearing hub (110) is able to oscillate along a trajectory that substantially passes through the rotation axis (C) of the input shaft (620), so that, for a predetermined angular position of the oscillating support (120), the axis (A) of the wheel-bearing hub (110) coincides with the rotation axis (C) of the input shaft (620).

2. The device (100) of claim 1, further comprising an actuator (210) configured to rotate the oscillating support (120) about the hinge axis (B) thereof.

3. The device (100) of claim 2, wherein the actuator (210) comprises a double-acting hydraulic cylinder (215).

4. A device (100) for connecting a wheel (R) to a vehicle, the device (100) comprising:
    an input shaft (620) able to be kinematically connected to an engine of the vehicle and having a rotation axis (C),
    an oscillating support (120) suitable for being hinged to a frame (T) of the vehicle on a predetermined hinge axis (B) parallel to and distanced from the rotation axis (C) of the input shaft (620),
    an auxiliary shaft (125) rotatably associated to the oscillating support (120) in a position coaxial to the hinge axis (B),
    a wheel-bearing hub (110) rotatably associated to the oscillating support (120) along a rotation axis (A) parallel to and distanced from the hinge axis (B),
    a first transmission device (625) configured to transmit motion from the input shaft (620) to the auxiliary shaft (125),
    a second transmission device (130) configured to transmit motion from the auxiliary shaft (125) to the wheel-bearing hub (110) and
    an actuator (210) configured to rotate the oscillating support (120) about the hinge axis (B) thereof, wherein the actuator (210) comprises a cogged crown/endless screw group.

5. A device (100) for connecting a wheel (R) to a vehicle, the device (100) comprising:
    an input shaft (620) able to be kinematically connected to an engine of the vehicle and having a rotation axis (C),
    an oscillating support (120) suitable for being hinged to a frame (T) of the vehicle on a predetermined hinge axis (B) parallel to and distanced from the rotation axis (C) of the input shaft (620),
    an auxiliary shaft (125) rotatably associated to the oscillating support (120) in a position coaxial to the hinge axis (B),
    a wheel-bearing hub (110) rotatably associated to the oscillating support (120) along a rotation axis (A) parallel to and distanced from the hinge axis (B),
    a first transmission device (625) configured to transmit motion from the input shaft (620) to the auxiliary shaft (125),
    a second transmission device (130) configured to transmit motion from the auxiliary shaft (125) to the wheel-bearing hub (110) and
    an actuator (210) configured to rotate the oscillating support (120) about the hinge axis (B) thereof, wherein the actuator (210) comprises a nut/nut screw group.

6. The device (100) of claim 1, comprising at least one of: a spring or suspension group configured to connect the oscillating support (120) to the vehicle frame (T).

7. The device (100) of claim 4, wherein a distance between the rotation axis (C) of the input shaft (620) and the hinge axis (B) is substantially equal to a distance between the hinge axis (B) and the rotation axis (A) of the wheel-bearing hub (110).

8. The device (100) of claim 7, wherein the tilting frame (120) is orientated in such a way that the rotation axis (A) of the wheel-bearing hub (110) is able to oscillate along a trajectory that substantially passes through the rotation axis (C) of the input shaft (620).

9. The device (100) of claim 1, wherein the second transmission device comprises a gearing (130).

10. The device (100) of claim 1, wherein the oscillating support (120) comprises a guard cover (145) configured to contain the second transmission device (130).

11. The device (100) of claim 1, wherein the auxiliary shaft (125) is coaxially housed in a tubular sleeve (150) fixed to the oscillating support (120).

12. The device (100) of claim 11, wherein the tubular sleeve (150) is rotatably inserted into a tubular element (600) able to be fixed to the vehicle frame (T).

13. The device (100) of claim 1, wherein the input shaft (620) is able to be coaxially connected to a half-shaft of a differential (195).

14. The device (100) of claim 1, wherein the first transmission device comprises a gearing (625).

15. The device (100) of claim 1, wherein the input shaft (620) is rotatably coupled and supported by a further support element (641), which can be fixed to the frame (T) of the vehicle and to which the oscillating frame (120) is also directly hinged.

16. An axle group comprising two devices (100) of claim 1, the devices (100) being independent of one another and exhibiting respective input shafts (620) aligned along a same axis.

17. A vehicle comprising an axle group as in claim 16.

* * * * *